(12) United States Patent
Otteman

(10) Patent No.: US 6,351,907 B1
(45) Date of Patent: Mar. 5, 2002

(54) SPIRAL CAM MECHANISM FOR RIFLE SIGHT ADJUSTMENT

(75) Inventor: Rodney H. Otteman, Aloha, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 09/494,963

(22) Filed: Jan. 31, 2000

(51) Int. Cl.⁷ .................................................. F41G 1/00
(52) U.S. Cl. ....................................................... 42/120
(58) Field of Search ................... 33/245–250; 359/399, 359/693; 356/247; 350/187; 42/122

(56) References Cited

U.S. PATENT DOCUMENTS

| | | | | |
|---|---|---|---|---|
| 2,583,042 A | * | 1/1952 | Dayton | 33/246 |
| 2,811,894 A | * | 11/1957 | Braker | 33/246 |
| 3,095,750 A | | 7/1963 | Mahn | 74/107 |
| 3,613,544 A | | 10/1971 | Pilhal et al. | 95/45 |
| 3,765,751 A | | 10/1973 | Noguchi | 350/252 |
| 3,930,720 A | | 1/1976 | Uesugi | 350/187 |
| 4,000,501 A | | 12/1976 | Sakaguchi et al | 354/197 |
| 4,080,043 A | * | 3/1978 | Altenheiner et al. | 350/76 |
| 4,247,161 A | * | 1/1981 | Unertl, Jr. | 33/246 |
| 4,643,542 A | | 2/1987 | Gibson | 350/562 |
| 4,998,811 A | * | 3/1991 | Basta | 350/560 |
| 5,020,892 A | * | 6/1991 | Glover et al. | 350/537 |
| 5,113,261 A | | 5/1992 | Morisawa | 358/225 |
| RE34,059 E | | 9/1992 | Akitake | 359/700 |
| 5,291,241 A | | 3/1994 | Hirano et al. | 355/55 |

FOREIGN PATENT DOCUMENTS

DE          297 20 737          3/1998

\* cited by examiner

Primary Examiner—Michael J. Carone
Assistant Examiner—Denise J Buckley
(74) Attorney, Agent, or Firm—Stoel Rives LLP

(57) ABSTRACT

A focus adjustment mechanism for a telescopic rifle sight includes a rotatable cam hub including a drive face and a spiral cam track formed in the drive face around an axis of rotation. An actuator slide of the adjustment mechanism is slidably mounted to a housing of the telescopic rifle sight for movement along a longitudinal axis of the housing. The actuator slide includes a cam follower that is operably engaged in the spiral cam track so that the actuator slide moves generally along the longitudinal axis in response to rotation of the cam hub to changing a setting of the adjustment mechanism. The actuator slide is operatively connected to a movable optical element positioned within the housing of the telescopic rifle sight to drive the optical element in response to rotation of the cam hub. The rate of linear movement of the optical element relative to the rate of rotation of the cam hub is controlled by the shape and arcuate angle of the spiral cam track. A spring biases the actuator slide relative to the housing to prevent rifle recoil from inducing changes to the setting of the adjustment mechanism.

20 Claims, 5 Drawing Sheets

SPIRAL CAM MECHANISM FOR RIFLE SIGHT ADJUSTMENT

TECHNICAL FIELD

The present invention relates generally to variable power telescopic sights having a side-mounted focus adjustment knob and, in particular, to such a sight having a side-mounted focus adjustment knob including a spiral cam mechanism for increasing the focus travel of the sight.

BACKGROUND OF THE INVENTION

Telescopic sights for rifles typically include eyepiece and objective lenses positioned at opposite ends of a tubular housing. Conventional variable optical power telescopic sights also include an erector lens positioned medially of the eyepiece and objective lenses and movable along a central longitudinal axis of the housing for adjustment of the optical power.

In these sights, an image focus adjustment compensating for variations in the distance from the marksman to the target is typically accomplished by longitudinal movement of the objective lens. One prevalent image focus adjustment implementation uses a threaded mounting ring that is coupled to the housing for rotation about the objective end of the housing. The marksman rotates the mounting ring, to adjust the position of a focusing element of the objective lens along the longitudinal axis of the housing.

This implementation is prone to image distortion caused by tilting of the objective lens during focus adjustment and makes it difficult to seal the ends of the housing to maintain within the telescopic sight a nitrogen gas charge necessary to prevent fogging and condensation on internal lens surfaces. This implementation also requires the marksman to stop viewing the target through the telescopic sight, move the rifle out of shooting position, and rotate the rifle to read markings on the outside of the housing or focusing ring which indicate the amount of focus adjustment. After viewing the focus ring adjustment indicator markings, the marksman then must reacquire the target.

A technique for varying the optical power of a telescopic sight is described in U.S. Pat. No. 3,058,391 of Leupold. This telescopic sight has an erector lens positioned between an objective lens and an eyepiece lens and adjustable along the longitudinal axis of the housing. It includes a field lens or collector lens located between the objective and the erector and movable in conjunction with and relative to movement of the power varying erector to compensate for focus effects resulting from movement of the erector. Movement of the collector and erector lenses to maintain focus during adjustment of the optical power of the telescopic sight is accomplished by turning a single adjustment ring concentrically mounted around the housing near the eyepiece end of the sight and connected to a cam sleeve mechanism within the interior of the sight housing.

Because bullet trajectory, wind conditions, and distance to the target can vary depending upon shooting conditions, quality rifle sights typically provide a mechanism for compensating for variations in these parameters by allowing the marksman to make small adjustments to the optical characteristics or the aiming of the sight relative to the rifle on which it is mounted. These adjustments are known as windage and holdover and are typically accomplished by lateral movement of the reticle within the telescopic sight, as shown in U.S. Pat. No. 3,058,391 of Leupold, or pivotal movement of lenses mounted to a pivot tube within the housing to divert the optical path of the observed light before it reaches the reticle, as shown in U.S. Pat. Nos. 3,297,389 and 4,408,842 of Gibson. In these designs, a marksman accomplishes adjustment of windage and holdover by turning a laterally protruding screw or turret that is operatively connected to the reticle or pivot tube. The range of adjustment for windage and holdover in these designs is limited by the space available within the housing for lateral movement of the reticle or pivotal movement of the pivot tube.

Variable power telescopic sights with side-mounted focus control knobs have recently been developed. These sights typically use the erector assembly and cam-sleeve mechanism to vary the power of the sight in accordance with the teachings of U.S. Pat. No. 3,058,391. To facilitate a side-mounted focus control knob, the objective lens system is split into two components, a fixed objective lens portion located at the objective end of the housing and a movable objective lens portion slidably mounted within the housing medially of the fixed objective and the erector assembly. The focus control knob protrudes laterally from the outer side of the sight housing opposite the windage adjustment turret and is mechanically coupled to the movable objective lens portion for adjusting the focus of the sight.

One known embodiment of the focus control knob is described in U.S. Pat. No. 4,643,542. This focus control knob includes an offset drive pin projecting within the interior of the housing and arranged so that rotation of the focus control knob results in orbital movement of the offset drive pin in a plane perpendicular to the axis of rotation of the focus control knob. The offset drive pin is engaged in an elongated slot formed in a link arm. The link arm is located within the interior of the housing and connected to the movable objective lens portion. The slot is oriented transversely of the longitudinal axis of the housing. The coupling between the offset drive pin and the link arm is such that orbital movement of the offset drive pin imparts movement to the movable objective lens portion along the longitudinal axis. One shortfall of the offset drive pin mechanism is that it results in movement of the movable objective lens portion at varying rates depending upon the position of the focus control knob. Because the offset drive pin moves orbitally, it moves along the longitudinal axis quickly when the adjustment knob is in the middle of its rotation, i.e., when the offset drive pin is near the top of its orbital arc, and slowly when the adjustment knob is near either limit of its 180 rotation.

SUMMARY OF THE INVENTION

An object of the invention is, therefore, to provide a telescopic sight having a side mounted focus control knob that allows an observer to adjust the focus of the sight and view a readout of the focus adjustment from the observing position without interrupting observation of the target through the sight.

Another object of the invention is to provide such a telescopic sight in which the side-mounted focus control knob includes a spiral cam mechanism that moves a movable objective lens portion longitudinally within a housing of the sight.

A further object of the invention is to provide such a focus control knob that rotates more than 180 degrees in response to which the movable objective lens portion moves with a predetermined longitudinal movement profile.

Yet another object of the invention is to provide a focus control knob for rifle-mounted telescopic sight that is of simple and rugged construction and is capable of withstanding without degradation of accuracy or precision the handling and environmental conditions to which hunting and military rifles are exposed.

These and other objects and advantages of the invention are accomplished in a telescopic sight that includes an elongate tubular housing that holds at opposite ends an objective lens system and an eyepiece lens, a manually adjustable movable erector lens for varying optical power, and a side mounted focus control device located medially along and protruding laterally from the outside of the housing for focusing the sight. The erector lens is located medially of the objective lens system and the eyepiece and pivotally mounted to a pivot tube within the housing to provide for windage and holdover adjustments made by manually adjustable aiming control devices.

In one type of telescopic sight, the objective lens system is split to facilitate side-mounted focus control and includes a fixed objective lens portion positioned at an objective end of the housing and a movable objective lens portion positioned inside the housing medially of the fixed objective lens portion and the erector. The fixed objective lens portion is fixedly mounted within the interior of the housing at one end to form an air tight seal for maintaining a nitrogen gas charge within the telescopic sight to inhibit fogging and condensation on internal lens surfaces. The movable objective lens portion is located in proximity and is linked to an adjustable side-mounted focus control knob that a marksman turns to move the movable objective lens portion along a central longitudinal axis of the housing and thereby adjust the focus of the telescopic sight.

The focus control knob of the present invention includes a cam hub mounted to the housing for rotation about an axis of rotation. The cam hub includes a drive face positioned facing the interior of the housing and a spiral cam track formed in the drive face around the axis of rotation and spiraling outwardly from the axis of rotation. An actuator slide positioned between the cam hub and the housing of the sight includes a cam follower slidably engaged with the spiral cam track. In one embodiment, the spiral cam track is a spiral groove and the cam follower includes a pin sized to fit within the spiral groove. In an alternative embodiment, the spiral cam track is a spiral ridge or rail and the cam follower is a notch or fork including a slot sized for engaging with the spiral ridge. The actuator slide is slidably mounted to the housing and rotatably constrained so that it slides generally along the longitudinal axis of the housing as the cam follower slides along the spiral cam track in response to rotation of the cam hub. A linkage connects the actuator slide to the movable objective lens portion so that the movable objective lens portion moves therewith. The movement profile of the movable objective lens portion, relative to rotational movement of the focus control knob, is controlled by the curvature of the spiral cam track. The arcuate angle or "turns" of the spiral cam track limit the amount of rotation of the focus control knob. A greater arcuate angle covered by the spiral cam track will allow more rotational motion of the focus control knob and, consequently, finer and more precise adjustment of the focus of the sight. More turns of the spiral cam track also dictates that its curvature will be more circular, which prevents rifle recoil from altering the sight's focus setting.

In another aspect of the invention, the spiral cam track may be of a length that allows rotation of the focus control knob more than 180 degrees. By increasing the amount of rotation of the focus control knob, the resolution of the focus adjustment can be made finer and more precise. It is also possible to design the spiral cam track so that the focus control knob rotates more than 360 degrees. Thus, for example, spiral cam tracks may be formed to have an arcuate angle covering 2, 3, 4, 5 or more turns, and any intermediate angular amount. The size of the spiral cam track is limited only by the size of the drive face and the physical constraints of the materials from which the adjustment mechanism is formed.

In a further aspect of the invention, the focus control knob includes a dial turret with exterior markings that indicate the amount of focus adjustment. This feature enables the marksman to use one eye to view the target through the telescopic sight and the other eye to read the dial turret focus indication markings without moving the rifle from the shooting position.

In still another aspect of the invention, a spring biases the actuator slide relative to the housing to prevent the focus of the scope from changing during rifle recoil.

In yet another aspect of the invention, the spiral cam track may be selected from a right or left-handed spiral to accommodate right-handed or left-handed adjustment mechanisms. The cam hub may include multiple spiral cam tracks all centered on the same axis of rotation, but interleaved. Multiple spiral cam tracks allow a single cam hub to be used to drive actuators for different telescopic sights, requiring different spiral cam curvature and adjustment profiles.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figures 1, 2:
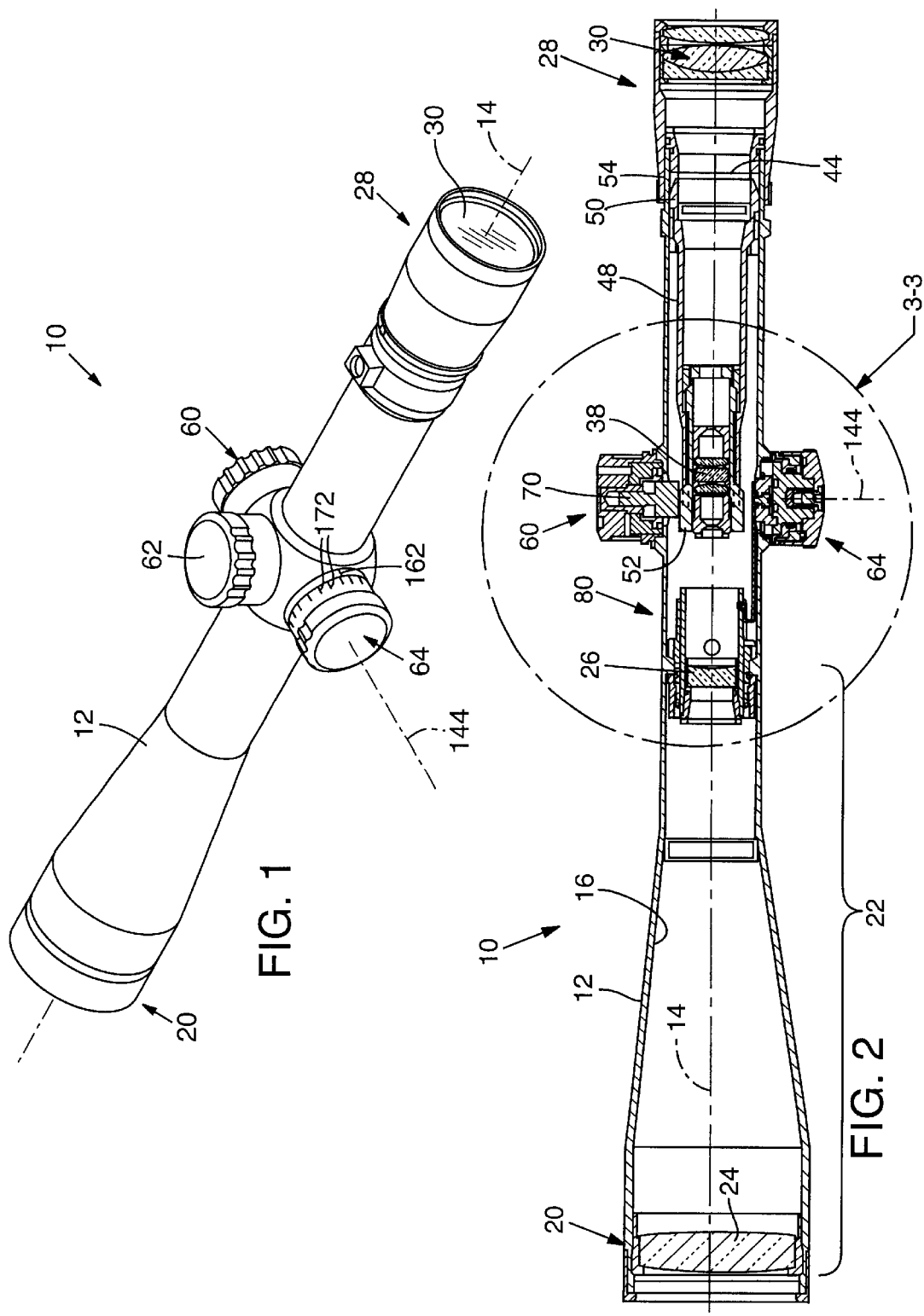
FIG. 1 is a perspective view of a telescopic rifle sight in accordance with the present invention.
FIG. 2 is a sectional view of the telescopic sight of FIG. 1.

FIG. 1 shows a pictorial view of a telescopic sight 10, which represents a first preferred embodiment of the present invention. FIG. 2 is an enlarged sectional view of telescopic sight 10. With reference to FIGS. 1 and 2, telescopic sight 10 includes an elongate tubular housing 12 having a central longitudinal axis 14 and an inner surface 16, and holding within its interior an optical system. Optical system includes, at an objective end 20 of housing 12, an objective lens system 22 having a fixed objective portion 24 and a movable objective portion 26 and, at an eyepiece end 28 of housing 12, an eyepiece 30. An erector 38 and a reticle 44 are positioned between objective lens system 22 and eyepiece 30. A pivot tube 48 includes a pivot end 50 and a distal end 52. Pivot end 50 is mounted in a pivot socket 54 formed on the inner surface 16 of housing 12 for pivotal movement of pivot tube 48 within housing 12. Pivot tube 48 supports erector 38 to allow lateral movement of erector 38 within the interior of housing 12. A windage control device 60, a holdover control device 62, and a focus control device 64 are all rotatably mounted to housing 12 for adjustment of the optical system, as described below. Rotation of windage and holdover control devices 60 and 62 causes threaded cores 70 to impart pivotal movement to pivot tube 48 in the manner well known in the art to adjust the aim of telescopic sight 10. Housing 12 and most other nonoptical components of telescopic sight 10 may be formed of aluminum alloy or other high strength, lightweight material. Lenses and other elements of the optical system may be formed of optical quality glass, plastic, or another suitable material.

Figure 3:
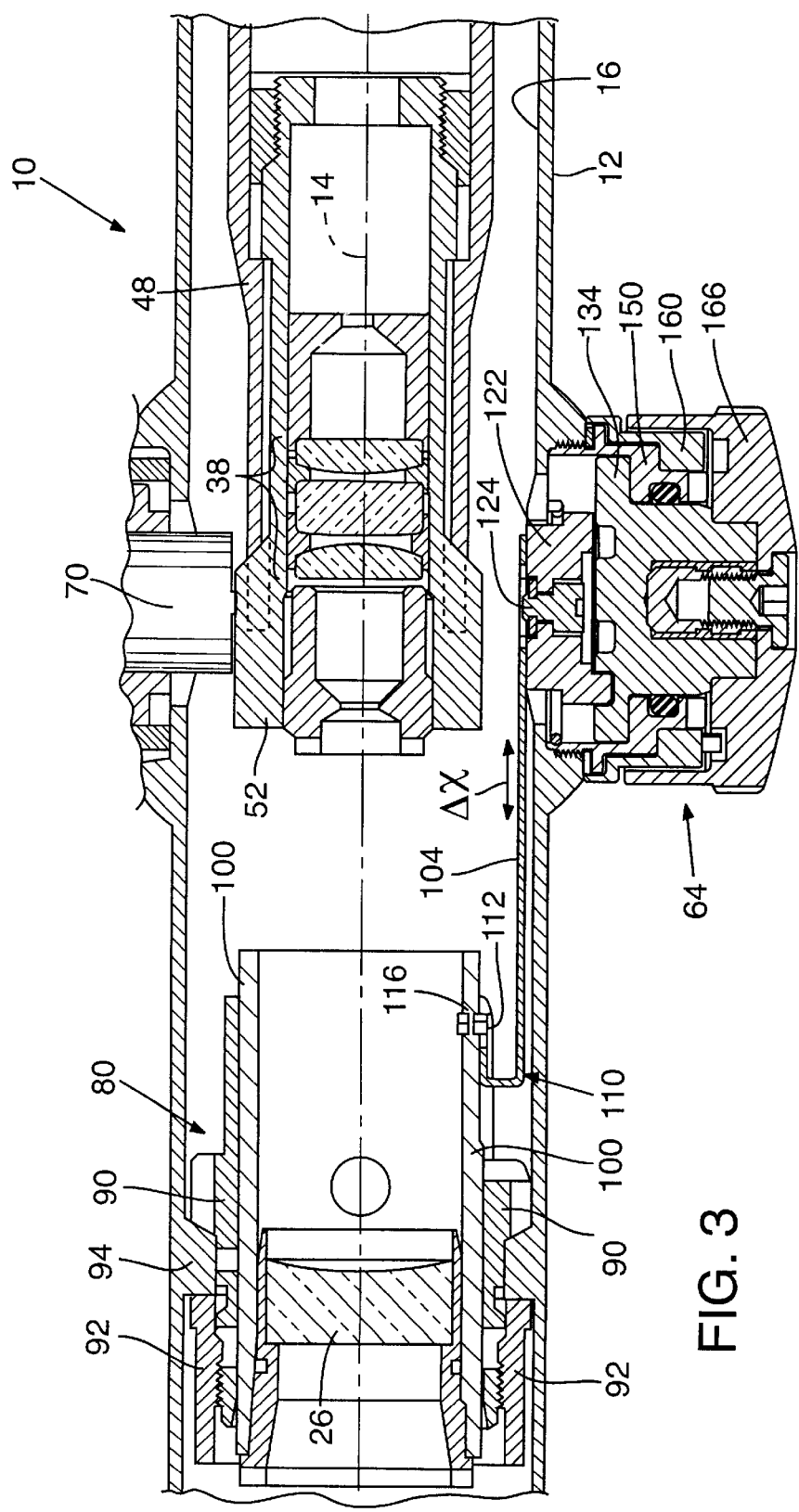
FIG. 3 is an enlarged sectional view of the telescopic sight showing detail of area 3—3 of FIG. 2.
Figure 4:
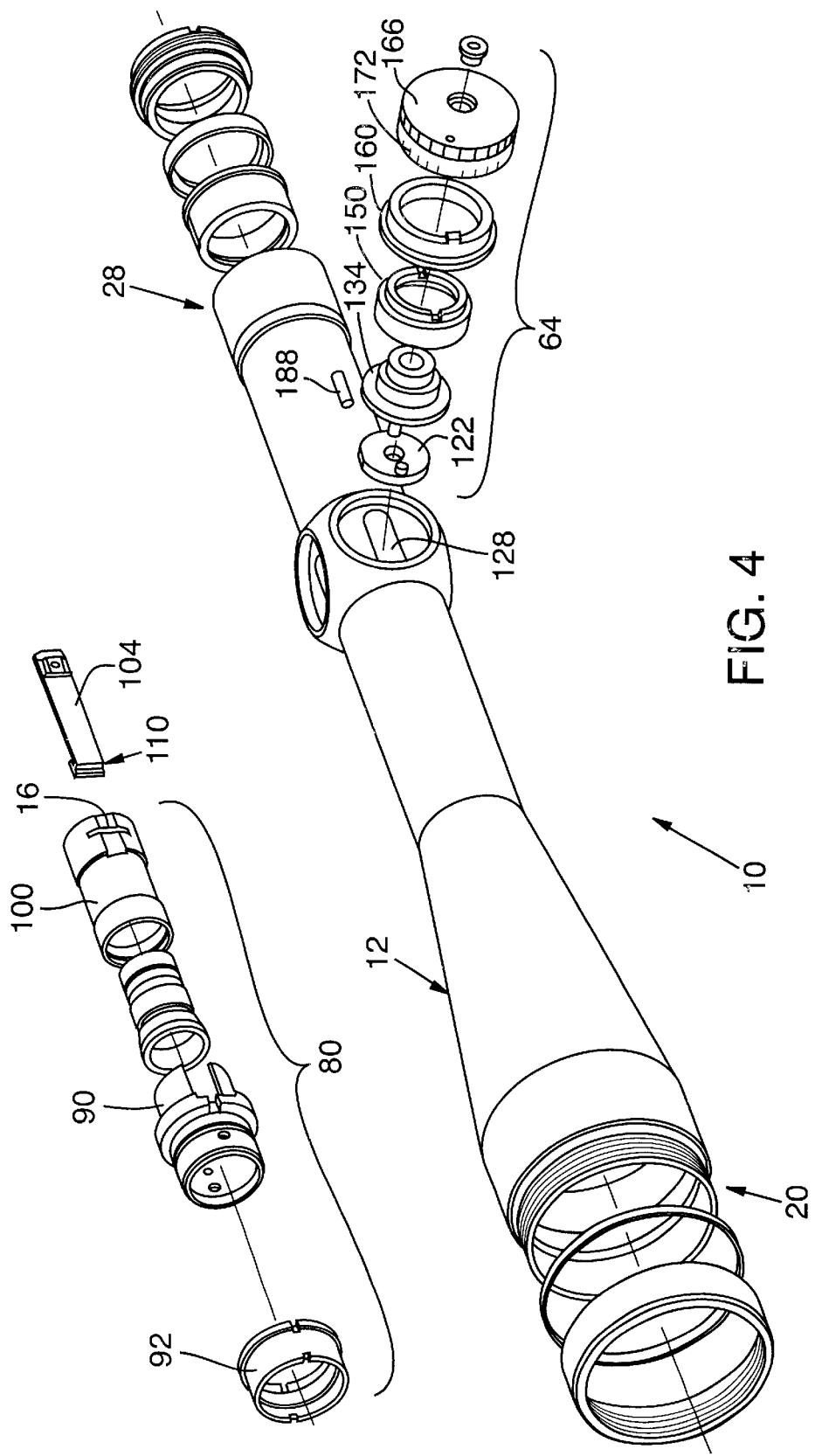
FIG. 4 is a partially exploded assembly view of the telescopic sight of FIG. 1 showing details of a movable objective portion and a focus adjustment knob of the telescopic sight.

FIG. 3 is an enlargement of circled area 3—3 of FIG. 2 showing details of movable objective portion 26 and focus control device 64, and omitting detail of windage adjustment knob 60 (FIG. 2). FIG. 4 is a partially exploded view of telescopic sight 10 showing components of focus control device 64 and a movable objective assembly 80. With reference to FIGS. 3 and 4, movable objective lens portion 26 is positioned within housing 12 medially of fixed objective lens portion 24 and pivot tube 48. Movable objective assembly 80 includes a carrier bushing 90 fixedly mounted within housing 12 and secured in place by a lock nut 92. A ridge 94 within housing 12 facilitates accurate and secure mounting of carrier bushing 90. A sliding lens carrier 100 is slidably mounted within carrier bushing 90. Sliding lens carrier 100 supports movable objective lens portion 26 for movement along longitudinal axis 14 of housing 12. A linkage 104 is rigidly connected at one end to sliding lens carrier 100 and at its other end to focus control device 64.

For ease of assembly, linkage 104 may include a spring tab portion 110 having a rib 112 sized to securely engage a lateral groove 116 on sliding lens carrier 100 without the use of fasteners. This allows linkage to be connected to sliding lens carrier 100 after installation of movable objective assembly 80, by inserting linkage 104 from the eyepiece end 28 of housing 12 and snapping rib 112 into place in lateral groove 116. It also allows linkage to occupy minimal space within housing 12 to allow maximal pivotal movement of pivot tube 48.

Figure 5:
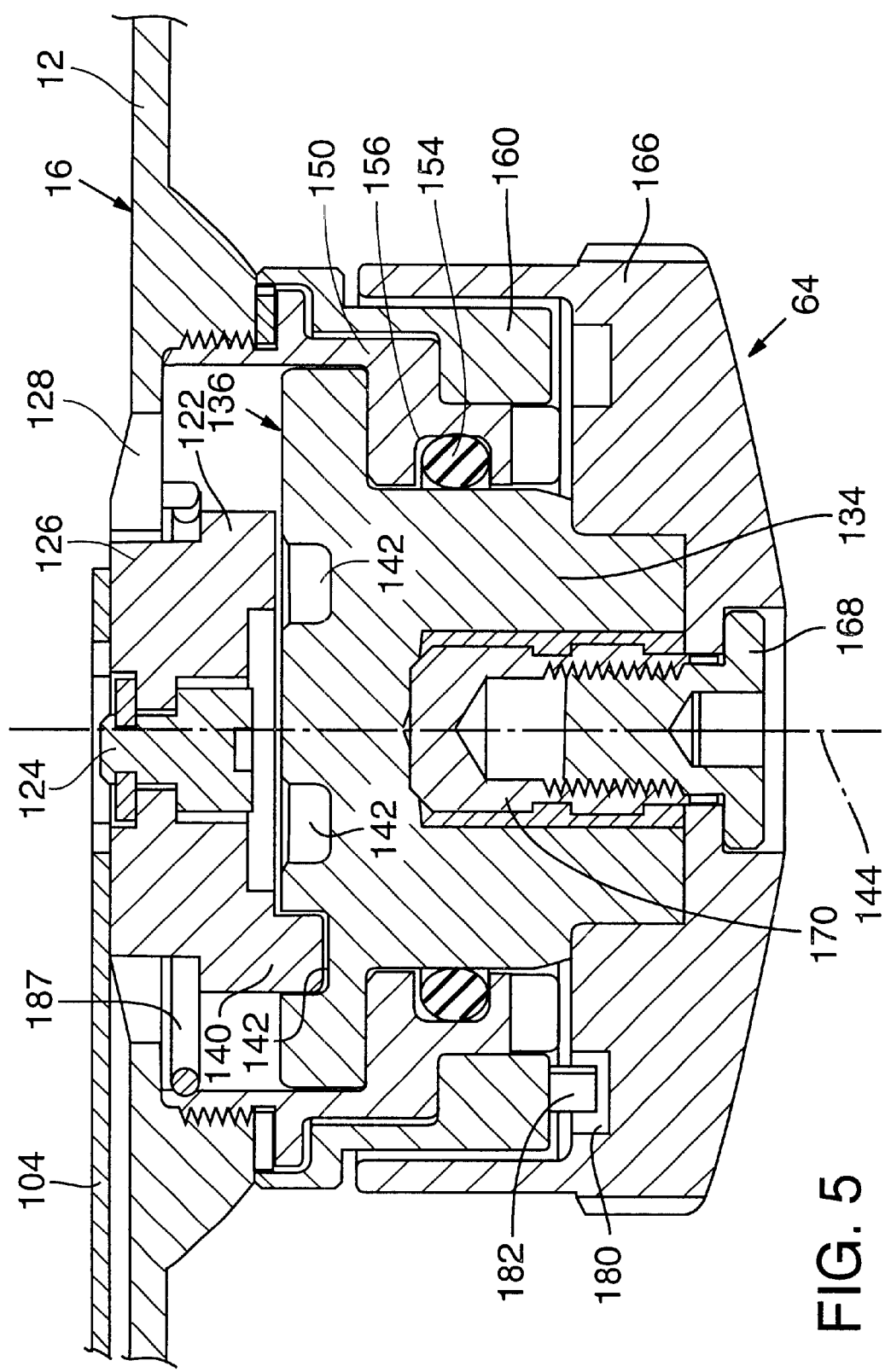
FIG. 5 is an enlarged sectional view of the focus adjustment knob of the telescopic sight of FIG. 1.
Figure 6A:
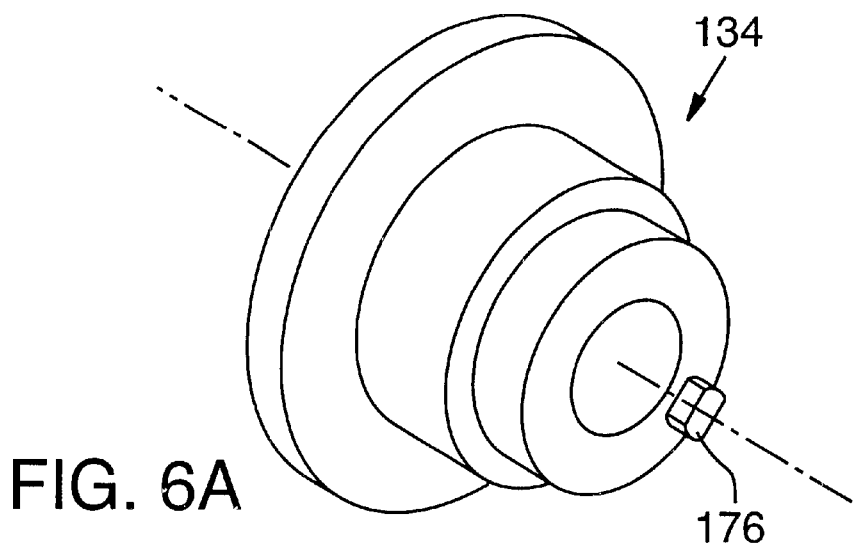
FIGS. 6A and 6B are respective top and bottom perspective views of a cam hub of the focus control knob of the telescopic sight of FIG. 1.
Figure 6B:
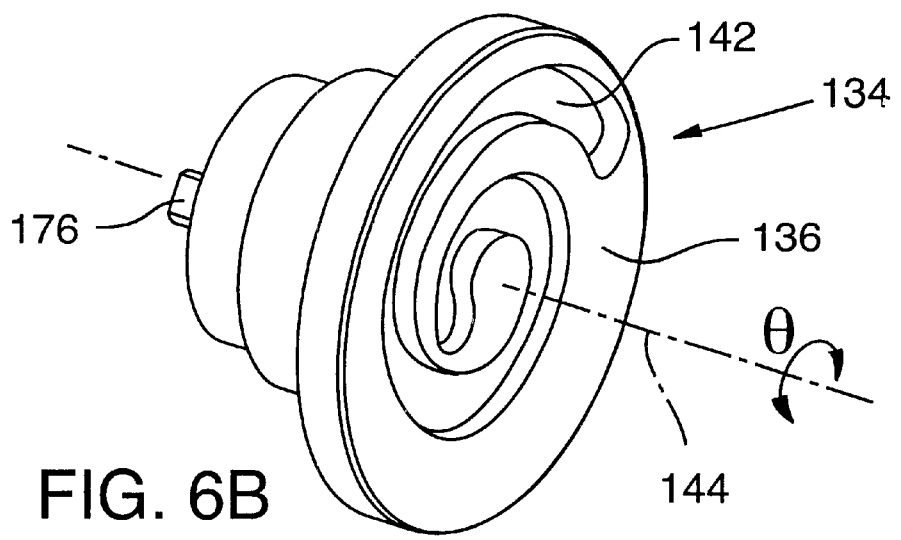

FIG. 5 is an enlarged sectional view of focus control device 64. With reference to FIGS. 4 and 5, focus control device 64 includes an actuator 122 slidably supported by housing 12 and coupled to linkage 104 by a fastener 124. Actuator 104 includes a slide block portion 126 sized to fit within a guide slot 128 of housing 12. Guide slot 128 is oriented generally parallel to longitudinal axis 14 of housing 12. A cam hub 134 is rotatably mounted to housing 12 so that actuator 122 is slidably captured between housing 12 and a drive face 136 of cam hub 134. FIGS. 6A and 6B are respective enlarged top and bottom perspective views of cam hub 134 showing detail of drive face 136. With reference to FIGS. 4, 5, 6A, and 6B, a cam follower pin 140 of actuator 122 extends into and is guided by a spiral cam groove 142 formed in drive face 136. Rotation of cam hub 134 about its axis of rotation 144 drives actuator 122 along guide slot 128, which in turn moves movable objective lens portion 26 along longitudinal axis 14 to adjust the focus of sight 10. The size of spiral cam groove 142 determines the amount of travel of actuator 122 and objective lens portion 26. The size of spiral cam groove 142 is limited only by the diameter of drive face 136. Cam hub 134 is preferably molded of a plastic resin, such as, for example, nylon, for ease of manufacture, but may be formed of any suitable rigid, smooth and wear-resistant material, for example metal.

A flange 150 is threadably connected to housing 12 to rotatably support cam hub 134. A seal 154, is seated in an inscribed circular groove 156 of flange 150 and contacts cam hub 134 to provide an air-tight seal between cam hub 134 and flange 150 to thereby maintain a nitrogen gas charge within sight 10. Seal 154 is preferably an elastomeric o-ring, but may be formed of any other suitable sealing material. Seal 154 may alternatively comprise a ridge (not shown) integrally molded as a single one-piece unit with cam hub 134. An indicator flange 160 is pressed on around flange 150 and includes a reference mark 162 (FIG. 1) oriented for viewing by a marksman using sight 10. A dial 166 is securely connected to cam hub 134 by a screw 168 so that cam hub 134 rotates with rotation of dial 166. Screw 168 is threadably connected to cam hub 134 or to a threaded metal insert 170 molded into cam hub 134. Dial 166 includes indicator markings 172 about its exterior (FIG. 1) that indicate to a marksman, by alignment relative to reference mark 162, the amount of rotation of focus control device 64. An orienting pin 176 (FIG. 6A) of cam hub 134 fits within a recess (not shown) of dial 166 to ensure that dial 166 is properly rotatably oriented relative to spiral cam groove 142. Dial 166 includes annular groove 180 within which rides a stop pin 182 of indicator flange 160. An optional limit pin (not shown) may be mounted on dial 166 to block travel of stop pin 182 along annular groove 180 and limit the rotation of focus control knob 64 to a subset of the possible range of adjustment. It will be obvious to persons skilled in the art that stop pin 182 could alternatively extend from dial 166 (not shown) to ride in an annular groove formed in indicator flange 160. A spring 186 biases actuator 122 along the longitudinal axis 14 to eliminate vibration of actuator 122 and movable objective lens portion 26 due to a clearance fit between spiral cam groove 142 and cam follower pin 140 necessary for smooth operation of focus control device 64. Spring 186 also prevents the focus setting of sight 10 from changing in response to rifle recoil. Spring 186 may be a flat circular spring 187 fit around actuator 122 or a coil spring 188 (FIG. 4) that fits within a pocket (not shown) of actuator 122. Alternatively, spring 186 can be implemented as part of movable objective assembly 80 by biasing sliding lens carrier 100 relative to carrier bushing 90.

Figure 7:
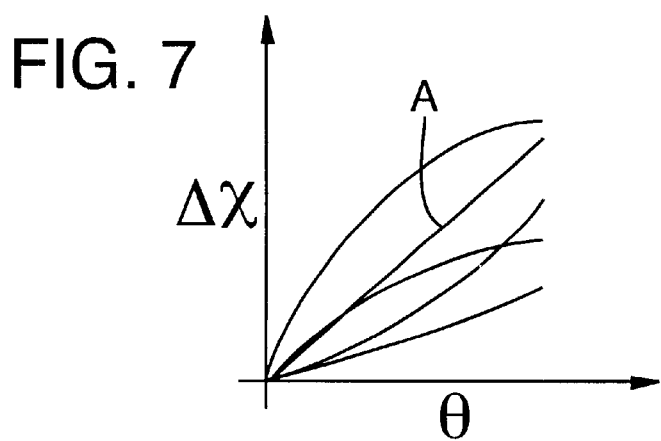
FIG. 7 is a graph of possible movement profiles associated with a focus control knob in accordance with the present invention, showing linear displacement of the movable objective lens portion relative to rotational displacement of the focus control knob.

Spiral cam groove 142 can be of any spiral shape and length suitable for causing movable objective lens portion 26 to move with a movement profile that will allow smooth and accurate adjustment of the focus of sight 10. FIG. 7 is a graph of five possible movement profiles, four of which are non-linear. The x-axis ($\Theta$) represents the angular displacement of cam hub 134. The y-axis ($\Delta x$) represents the linear displacement of movable objective portion 26. With reference to FIGS. 6B and 7, spiral cam groove 142 is formed in the shape of an Archimedean spiral defined by the polar equation:

$$dx = a \cdot d\Theta + b$$

where a and b are constants. The use of an Archimidean spiral (as shown in FIG. 6B) results in a constant rate of movement of objective lens portion 26 in response to constant rate of rotation of cam hub 134. This constant rate of movement is illustrated in FIG. 7 by linear movement profile "A." It will be obvious to those having skill in the art that many variations can be made on the shape of spiral cam groove 142 to produce different movement profiles such as, for example, the non-linear movement profiles illustrated in FIG. 7.

It will be obvious to those having skill in the art that many chances may be made to the details of the above-described embodiments of this invention without departing from the underlying principles thereof. The scope of the present invention should, therefore, be determined only by the following claims.

What is claimed is:

1. An adjustment mechanism for a telescopic rifle sight of the type including an elongate tubular housing having a longitudinal axis and a movable optical element mounted within the housing, comprising:

a cam hub mounted to the housing for rotation about an axis of rotation, the cam hub positioned so that the axis of rotation is substantially perpendicular to the longitudinal axis, the cam hub including a drive face and a spiral cam track formed in the drive face around the axis of rotation; and an actuator slidably mounted for movement along the longitudinal axis of the housing and including a cam follower operably engaged in the spiral cam track so that the actuator moves generally along the longitudinal axis in response to rotation of the cam hub, the actuator operatively connected to the optical element to drive the optical element in response to rotation of the cam hub.

2. The adjustment mechansim of claim 1 in which the spiral cam track turns greater than 180 degrees so that the cam hub rotates more than 180 degrees.

3. The adjustment mechansim of claim 1 in which the spiral cam track turns greater than 360 degrees so that the cam hub rotates more than 360 degrees.

4. The adjustment mechansim of claim 1 in which the actuator is positioned between the cam hub and the housing, the actuator rotationally constrained so that the actuator does not rotate in response to rotation of the cam hub.

5. The adjustment mechansim of claim 1, further comprising a seal for providing a gas-tight fit against the housing.

6. The adjustment mechansim of claim 1 in which the spiral cam track includes a spiral groove and in which the cam follower includes a pin.

7. The adjustment mechansim of claim 1 in which the spiral cam track is formed as a substantially Archimedean spiral so that the actuator is moved at a constant rate in response to a constant rate of rotation of the cam hub.

8. The adjustment mechansim of claim 1 in which the spiral cam track has a curvature that causes the actuator to move at a nonlinear rate in response to a constant rate of rotation of the cam hub.

9. The adjustment mechansim of claim 1 in which the cam hub is formed of a plastic resin to reduce friction.

10. A telescopic rifle sight having an adjustable focus setting and an adjustable aiming offset, the telescopic rifle sight including a tubular housing having a longitudinal axis, an interior and exterior, and first and second ends, and an elongate erector assembly pivotally mounted within the interior of the housing generally along the longitudinal axis and medially of the first and second ends, the erector assembly including a distal end, the telescopic rifle sight comprising:

(a) an adjustable aiming control device in operative association with the erector assembly for pivotally moving the erector assembly so that the distal end moves within the housing transversely of the longitudinal axis to thereby adjust the aiming offset of the telescopic rifle sight;

(b) a movable optical element slidably mounted within the housing for movement generally along the longitudinal axis; and (c) a manually adjustable focus control device projecting outwardly from the exterior of the housing in a direction transverse to the longitudinal axis, the focus control device including:

(i) a cam hub mounted for rotation about an axis of rotation, the cam hub positioned so that the axis of rotation is substantially perpendicular to the longitudinal axis, the cam hub including a drive face facing toward the interior of the housing and a spiral cam track formed in the drive face around the axis of rotation, the spiral cam track spiraling outwardly from the axis of rotation, and (ii) an actuator slide slidably mounted to the housing for movement along the longitudinal axis and including a cam follower operably engaged in the spiral cam track so that the actuator slide moves generally along the longitudinal axis in response to rotation of the cam hub, the actuator slide operatively connected to the movable optical element to drive the movable optical element in response to rotation of the cam hub and thereby adjust the focus setting of the telescopic rifle sight.

11. The telescopic rifle sight of claim 10 in which the spiral cam track of the focus control device turns greater than 180 degrees so that the cam hub rotates more than 180 degrees.

12. The telescopic rifle sight of claim 10 in which the spiral cam track of the focus control device turns greater than 360 degrees so that the cam hub rotates more than 360 degrees.

13. The telescopic rifle sight of claim 10 in which the actuator slide is positioned between the cam hub and the housing and rotationally constrained by the housing so that the actuator slide does not rotate in response to rotation of the cam hub.

14. The telescopic rifle sight of claim 10, further comprising a gaseous charge within the housing and a seal positioned between the cam hub and the housing for maintaining the gaseous charge within the housing.

15. The telescopic rifle sight of claim 14 in which the focus control device includes a flange rigidly mounted to the housing over the cam hub to rotatably capture the cam hub against the housing, and in which the seal includes an o-ring positioned between the cam hub and the flange.

16. The telescopic rifle sight of claim 10 in which the spiral cam track includes a spiral groove and in which the cam follower includes a pin.

17. The telescopic rifle sight of claim 10 in which the spiral cam track of the focus control device is formed as a substantially Archimedean spiral so that the actuator slide is moved at a constant rate in response to rotation of the cam hub at a constant rate.

18. The telescopic rifle sight of claim 10 in which the spiral cam track of the focus control device has a curvature that causes the actuator slide to move at a nonlinear rate in response to a constant rate of rotation of the cam hub.

19. The telescopic rifle sight of claim 10, further comprising a spring for biasing the actuator slide relative to the housing in a direction along the longitudinal axis to prevent the focus setting from changing in response to rifle recoil.

20. The telescopic sight of claim 10, further comprising a linkage operatively connecting the movable optical element to the actuator slide, the linkage positioned adjacent the erector assembly and sized so that the pivotal movement of the erector assembly is not restricted by the linkage.

* * * * *

UNITED STATES PATENT AND TRADEMARK OFFICE
CERTIFICATE OF CORRECTION

PATENT NO.     : 6,351,907 B1
DATED          : March 5, 2002
INVENTOR(S)    : Rodney H. Otteman It is certified that error appears in the above-identified patent and that said Letters Patent is hereby corrected as shown below:

Column 7,
Line 2, "chances" should read -- changes --.
Lines 25, 28, 31, 35, 38, 40, 44 and 48, "mechansim" should read -- mechanism --.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,351,907 B1
DATED : March 5, 2002
INVENTOR(S) : Rodney H. Otteman

It is certified that error appears in the above-identified patent and that said Letters Patent is hereby corrected as shown below:

Title page,
Item [63], should read
-- Related U.S. Application Data
Provisional application No. 60/117,836, filed on January 29, 1999 --.

Signed and Sealed this

First Day of July, 2003

JAMES E. ROGAN
*Director of the United States Patent and Trademark Office*